Figure 1:
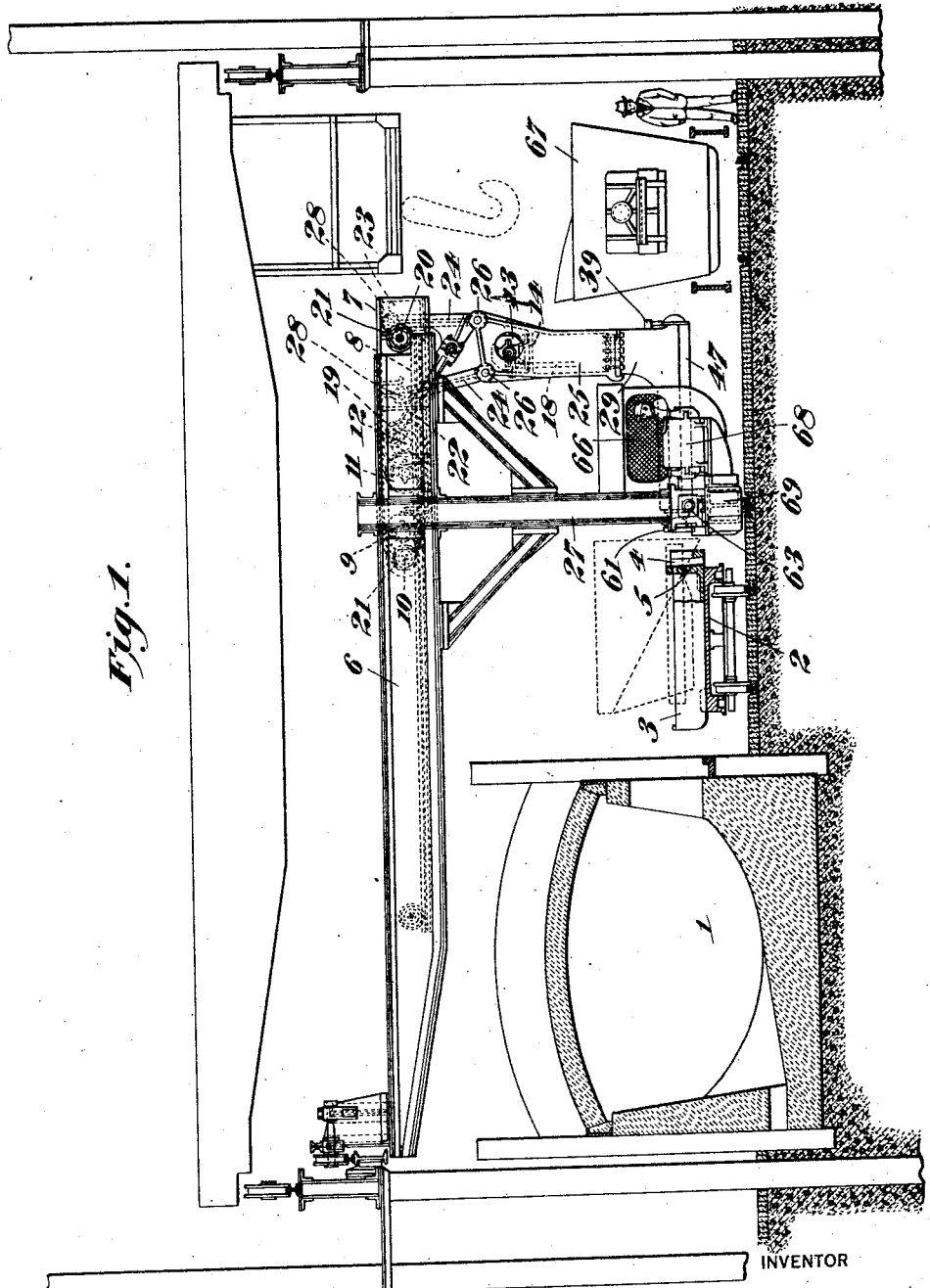

Oct. 5, 1926.

H. R. GEER

FURNACE CHARGING MACHINE

Filed April 15, 1922   3 Sheets-Sheet 1

1,602,073

INVENTOR
Harry R. Geer.
BY
Geo. E. Thackray
ATTORNEY

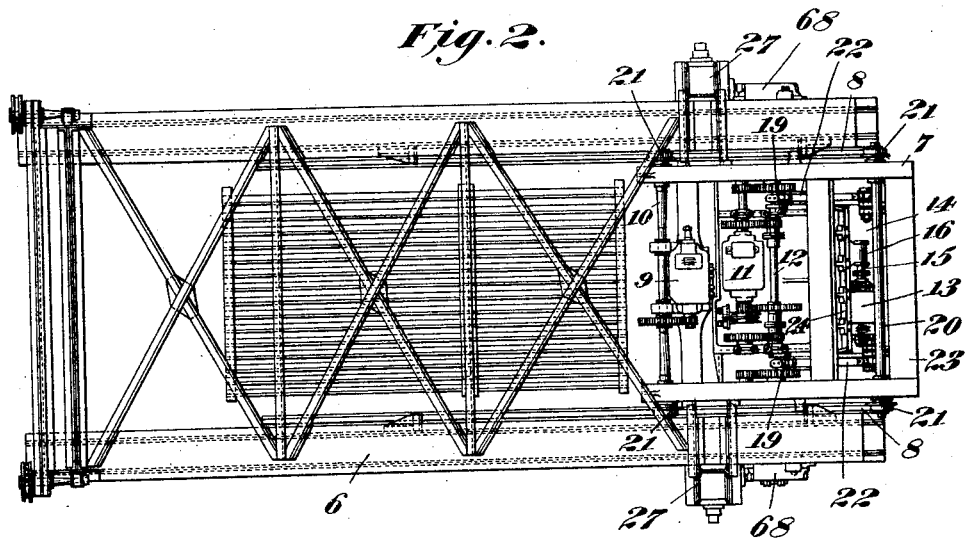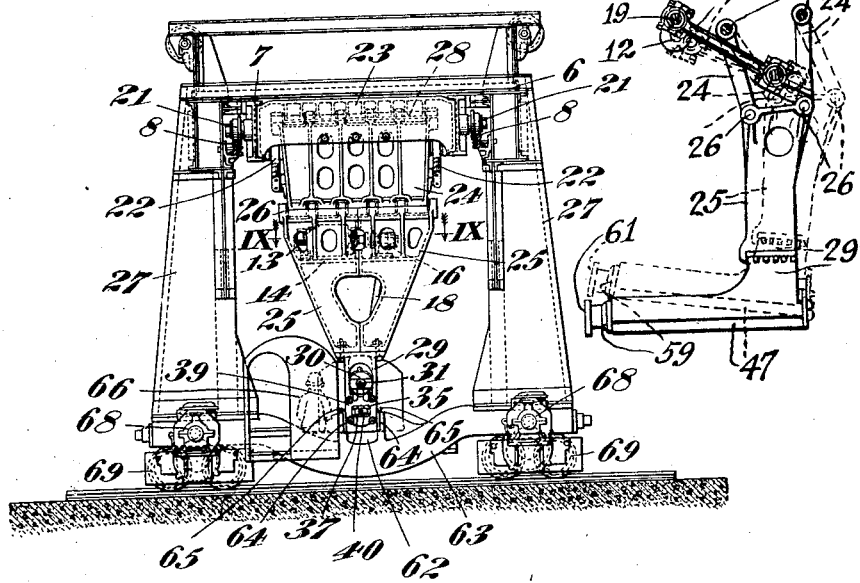

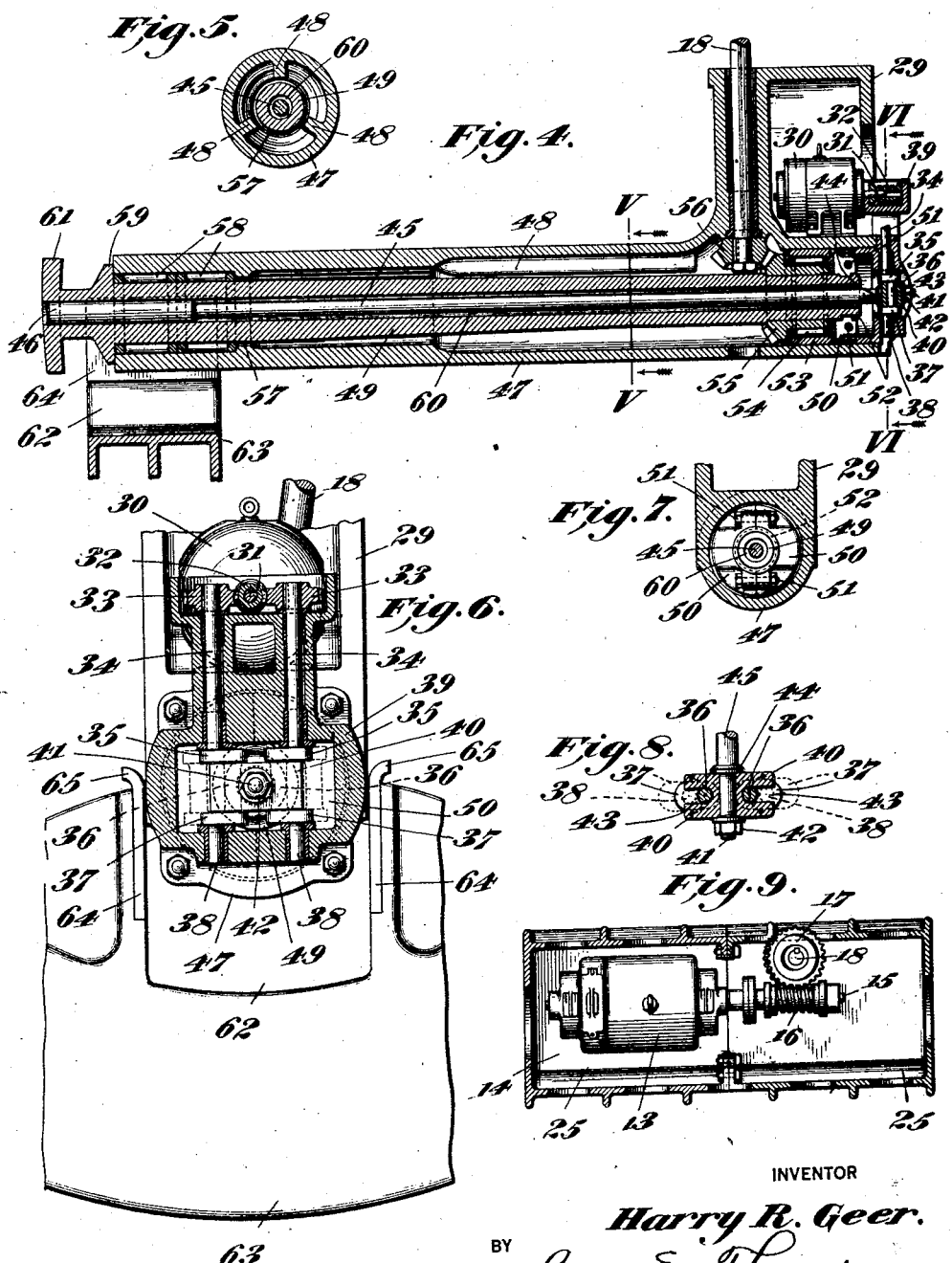

Patented Oct. 5, 1926.

1,602,073

UNITED STATES PATENT OFFICE.

HARRY R. GEER, OF JOHNSTOWN, PENNSYLVANIA.

FURNACE-CHARGING MACHINE.

Application filed April 15, 1922. Serial No. 553,138.

My invention relates to apparatus for charging furnaces, and is particularly adapted for charging materials of various kinds into open hearth steel furnaces of any type.

The prevailing kinds of open hearth furnace charging machines, including both the high and low type, employ tracks comprising two widely spaced rails, on which they are operated, extending lengthwise and in front of a row of furnaces and on the charging floor thereof, and by reason of this style of construction they require a much greater width of floor space than my machine, which has only one rail on the floor and another rail above the furnace, which latter may be on the far side thereof, thus utilizing the space above the furnace and saving the floor space for other necessary uses. By reason of my arrangement this leaves room on the charging floor for other apparatus, such as hot metal ladles or other materials or appliances, behind the charging machine and between it and the rear wall or columns of the building.

In connection with my machine I also provide the usual railway track of narrow or standard gauge extending lengthwise of the floor directly in front of the furnaces, and adapted to carry charging cars, which in turn hold and transport the usual charging boxes containing the material to be charged, such as pig iron, scrap of various kinds, or limestone, magnesite, dolomite, sand, etc., etc.

In certain previous open hearth furnace plants using the low or floor type of charging machines, floor space is not available for hot metal delivery tracks, in which case it is customary to deliver the molten pig metal to the furnace in very large ladles carried by cranes, which transport said ladles over the charging machine, and this is a very hazardous and confusing practice, and especially so in a very long building, and causes frequent interference of one crane with another or with the charging machines, and also interrupts the general floor operations, thus slowing down the work of such a plant.

By reason of my arrangement and construction with a single floor rail, the charging machine may be so arranged as to leave a sufficiently wide space between it and the rear columns or wall of the building, allowing room for the hot metal ladles to pass behind the charging machine, even though the space between the furnace and the wall or columns of the building is no greater than heretofore customary. The arrangement of my machine also allows the piling or refractory and other materials on the floor at locations nearer the furnaces than with the other types, and consequently greatly facilitates and ecomonizes the operations on this account.

In prior machines the operator has his seat and controls arranged on one of the quick-moving portions of the apparatus, which carries the charging bar and which reciprocates backward and forward, and this is annoying to the operator and makes it difficult for him to conduct the operations with the necessary delicacy and skill, and frequently results in breaking the door jambs of the furnaces or other constructions. In my arrangement the operator and controls are arranged on a stationary portion of the apparatus, which results in more rapid and efficient control and operation. I also provide a motor-operated locking bar, which makes this operation much easier for the operator than the prior manual movement, while at the same time much safer.

I also arrange the arm motion of my machine by employing an L-shaped frame suspended on radial links, operated by a crank motion, which eliminates the customary trunnion bearings of prior machines and affords a much more rigid frame than heretofore employed.

I also arrange side supports for the charging arm which are formed integral with or securely mounted on the main truck frame, which eliminates unnecessary or destructive stresses in the trolley and other parts due to pushing the charging box cars from place to place at the furnaces, as required.

My machine consists generally of a metal frame work having an upright portion in the form of standards or posts of substantial width having wheeled trucks on which their lower ends are mounted; and supported by said standards are a pair of heavy girders extending horizontally and secured and braced thereto. On the forward ends of these girders is a truck adapted to run on a rail mounted on other stationary girders above the furnaces, while the trucks at the lower ends of the standards are adapted to run on a single rail on the furnace charging floor. A carriage is provided adapted to be moved forward and backward on a pair of rails carried by the horizontal girders, and secured to the carriage is the crank or angle-shaped rear portion of the charging arm, the upper end of which is carried on links, pivoted to it and the carriage, which are spaced apart and so inclined that the swinging movement of said links will raise and lower the charging bar in a tilting manner as hereinafter more fully described. Secured to the lower part of the angle-shaped portion is the charging bar, the forward end of which is provided with a flange adapted to engage with the usual charging boxes, raise them from the charging cars, project them forward, and then rotate them to discharge their contents into the furnace, and then by reverse movements withdraw them and put the empty boxes on the cars again, and this operation is repeated with other boxes.

From time to time the train of loaded cars carrying the charging boxes must be moved along their tracks so that each box must preferably register with the door openings in order to obviate unnecessary longitudinal travel of the machine, and this may be accomplished very well by my machine, as it may be traversed on its tracks while the end of the bar is against the train of cars to push them in either direction as required. The forward portion of the charging bar is, at such time, adapted to rest in a socket formed in the frame, and the upper part of the rear end or L-shaped portion is wide and provided with substantial means for securing it to the rest of the structure, thus preventing sidewise displacement or deflection, so that in these respects my machine is much stiffer and stronger than the prior ones which do not have these features.

Motors, gearing and connections are also provided for traversing the carriage, to move the charging bar backward and forward; another motor and connections are provided to tilt the bar upwardly or downwardly, and power mechanism is also provided whereby the flanged end of the charging bar is locked to a charging box and unlocked from the same, and motor driven means are also provided for rotating the boxes to discharge their contents into the furnaces and to turn them upright again.

The arrangements of the links at the supporting end of my charging bar is such that they are inclined toward each other, and their axes, if prolonged, would meet at a point near the rear end of the L-shaped portion of the charging bar, so that their axes may be said to focus at that location. A swinging motion of these links in a backward direction, by reason of their inclinations and arrangements, will cause the bar to tilt upwardly, and a swinging movement of the links in a forward direction will cause the charging bar to be tilted downwardly, while the rear end of the same is substantially stationary.

A seat is provided for the operator in a cab mounted on the stationary portion of the apparatus, and various power means are provided for the different movements, which may consist of electric motors with the usual switches, rheostats or other convenient controls, and provided with mechanical connections, such as shafts, gears, worms, worm wheels, cranks, etc.

Having thus given a general description of my invention, I will now, in order to make the matter more clear, refer to the annexed three sheets of drawings, which form part of this specification, and in which like characters refer to like parts:—

Figure 1 is a vertical transverse diagrammatic section of an open hearth steel plant illustrating the application of my invention which is in side elevation; Figure 2 is a top plan view of my charging machine; Figure 3 is a rear end elevation thereof; Figure 4 is a vertical central longitudinal section elevation through the charging arm; Figure 5 is a transverse section through the charging arm taken on the line V—V of Figure 4; Figure 6 is a vertical sectional elevation taken on the line VI—VI of Figure 4; Figure 7 is a vertical transverse sectional elevation through the rear end of the charging arm, the section being taken just back of the split collar and looking in the direction of the collar; Figure 8 is a detail sectional elevation through the cross head on the rear end of the locking rod, showing the crank arms, etc., and Figure 9 is a transverse sectional elevation through the swing-hinged arm taken on the line IX—IX of Figure 3. Figure 10 shows the hinged bracket arm and the bar of the charging arm in their intermediate and rear positions indicating that when these are swung rearwardly on the swinging links the charging bar is tilted upwardly and then swung in reverse direction the charging bar is tilted downwardly, as further explained herein.

Referring now to the characters of reference on the drawings:—1 indicates an open hearth furnace in general, which is shown as an open hearth steel melting furnace of the gas-fired type, but this may be an electric furnace or any other type of furnace into which material may be charged by an apparatus; 2 is the charging car of the general type heretofore used, and the cars are generally made up into small trains and transported on standard or narrow gauge tracks in front of the furnaces as illustrated. These cars carry charging boxes 3 which are adapted to contain any materials to be charged into a furnace. The charging box 3 is provided with a groove or socket 4 in the rear end thereof, and also with a hole 5 as illustrated adapted to receive the flanged end 61 of the charging bar 47 and the end 46 of the locking rod 45, this detail being somewhat similar to that heretofore used, but the manner of operating the locking bar is different as will hereinafter be more fully described. The principal overhead portion of my charging machine is comprised of a pair of girders or beams 6, the forward ends of which are carried on a track supported on fixed girders over the rear side of the furnace and are mounted on suitable wheels as illustrated, while the rear portion is carried on a single floor rail 69 as illustrated. A movable carriage 7 is mounted on the rails 8 secured to the girders 6, and is adapted to be moved backward and forward longitudinally thereof, the forward position being indicated by the dotted wheel and the rear position illustrated by the wheels 21 in full lines in Figure 1. This carriage is mounted on rails 8 and is provided with an electric motor 9 geared to the axle 10 of the pair of front wheels 21 in order to move the carriage backward and forward. A motor 11 is provided for operating the hinged bracket arm 25 and this is connected to the operating shaft 12 thereof so that the revolution of the motor in either direction will cause the links 24 to swing and the hinged arm 25 to similarly swing backward and forward in a substantially vertical plane and to consequently tilt upward or downward the charging arm 47 attached thereto and forming part thereof.

It should be noted that as illustrated in Figure 1, while the charging bar is substantially horizontal, the forward link or hinge member 24 is inclined from the vertical and its lower portion is in the rear of its upper portion, while at this time the rear link or hinge member 24 is approximately vertical and its upper pivot may be somewhat higher, as shown, although it may be on the same level or otherwise as desired. As these links or hinge members are swung toward the rear by the action of the motor 11, this causes the charging arm 47 to tilt upwardly, and the forward part of the same will be lifted to a considerable extent, while the rear lower corner will remain substantially stationary. This is due to the fact that the forward link will, by reason of its prior inclination, rise more quickly than the rear link during their rearward movement, so that the forward pivot of the hinged end 25 will rise more than the rear one, with the result of tilting the charging bar upwardly as described. A reverse movement of the links will cause the charging bar to be tilted downwardly.

A motor 13 is provided, which is mounted on the web 14 of the hinged end of the charging arm and provided with a shaft 15, on which the worm 16 is secured. A worm wheel 17 is provided mounted on a shaft 18, and its other end is provided with a beveled pinion 56, which is adapted to mesh with the beveled gear 55, which is secured on the inner rotatable portion 49 of the charging arm. The revolution of this motor will rotate the inner portion 49 of the charging arm 47 and turn the charging boxes correspondingly.

The links or hinge members 24 are pivoted with upper pivot joints 28 and links 22 are provided and pivoted at 26 to the rear hinged member 24, as illustrated, and are pivotally connected with the crank arms 19, which are mounted on the operating counter shaft 12, which is geared to and operated by the motor 11. The revolution of this motor will cause the hinged members 24 to swing in either direction as desired to tilt the charging arm up or down as previously described. 20 is the rear axle for the carriage 7 and is provided with a pair of rear wheels 21 as shown, and 23 indicates the rear end portion of the carriage frame, and pivoted or hinged joints 26 are provided between the hinge members 24 and the hinged end 25 of the charging arm, while 27 indicates the standards or upright side frames of the machine. 29 is the rear portion of the charging arm which is firmly secured to the hinged portion 25 by a strongly bolted connection as illustrated, so that it can be removed for repairs and replaced. 30 is a motor mounted within the rear portion 29 of the charging arm and is provided with a locking rod 45; 31 is the shaft therefor provided with a worm 32 mounted thereon, and the worm gears 33 are adapted to mesh therewith and be driven by the worm 32, and these worm gears are mounted on crank shafts, the upper portions of which are 34, provided with upper crank arms 35 and lower crank arms 37, while the lower ends of these crank shafts are 38. Crank pins 36 are provided which are adapted to be operated within the slots or notches 43 of the crosshead 40, which is mounted on the locking rod, and the revolution of these cranks, by means of the motor to which they are connected, will consequently move the locking rod 45 backward or forward to project or retract its end 46 as desired. 41 is the ear end of the locking rod provided with a nut 42 to hold the crosshead 40 in position against the collar 44. The outer shell 47 of the charging arm is provided with radial ribs 48 to stiffen it and at the same time serve as guides for the inner rotatable portion 49, which latter is provided with a split collar 50 mounted on its rear end, secured together by means of the bolts 51 and fitting within the groove 52 in the rotatable portion 49, which collar, by abutting against the adjacent parts, serves to hold the said inner rotating member 49 longitudinally in proper position. The inner end of the rotatable portion 49 of the charging arms is provided with a roller bearing 54, the outer shell of which is 53. An inwardly projecting flange 57 is provided on the inner face near the forward end of the outer shell 47, against which are seated the roller bearings 58, while the outer end of the rotatable portion 49 is provided with an annular flange 59 abutting the outer end of the shell 47 to further position and enclose the parts. The locking rod 45 is mounted within the cylindrical opening 60 in the rotatable arm 49 as illustrated. A truck frame member 63 is provided, having an opening or notch 62 at its central portion forming cheek pieces, lined on each side with wearing plates 64, having upper curved ends 65, and this opening is adapted to receive the charging bar, near its outer end, to hold it firmly in a lateral direction while the bar is being used to push charging cars 2 on their track, thus preventing transmission of stresses to the carriage and other parts. 66 indicates the cage for the operator, within which are the various controls; 67 is a hot metal ladle mounted on a car adapted to travel on its track as indicated in Figure 1, the wheels not being shown. Motors 68 are provided to rotate wheels 69 on the track on which the charging machine is mounted. 39 is a casing for the cranks 35 and appurtenances.

In Figure 1 a diagrammatic representation is given of a crane adapted to handle the hot metal ladle 67, one of the hooks thereof being shown in dotted lines. This forms no part of my invention, but is shown in order to indicate that the crane cage and hooks and ladle have enough space behind the charging machine and between it and the wall, thus obviating the necessity of the prior practice of carrying the hot metal ladle over the charging machine, as heretofore described.

The operation of my machine is as follows:—A train comprising a number of charging cars is delivered in front of and near the furnace on their track with some of the charging boxes opposite the furnace doors. Having first been or moved upwardly, the flanged end 61 of the charging bar, by tilting downwardly, is inserted in the socket 4 of the charging box, the end 46 of the locking pin 45 is projected within the hole 5, and the motor 11 is then operated to swing the upper part of the hinged end 25 of the charging arm in a rearward direction, which tilts the charging arm 47 and its attachments in an upward direction, lifting the charging box 3 from the car 2; then the motor is operated to project the carriage 7, carrying the charging arm, in a forward direction, thus inserting the charging box and its contents within the furnace; then the motor 13 is operated in such a way as to rotate the charging box and turn it upside down and deposit its contents into the furnace, and by a reversal of these movements the charging box is turned upright, withdrawn from the furnace, and seated on the car, the charging arm withdrawn therefrom and the contents of another box is similarly charged. The socket 4 of the charging box is provided with the customary side walls and a bottom stop forming part of the boundaries of said socket, the said side walls being adapted to contact with the sides of the flanged end 61 in order to prevent the charging box from turning on the charging bar, and this socket may be similar to that shown in United States Patent to S. T. and C. H. Wellman, No. 589,768, for charging box, dated Sept. 7, 1897.

When it is desired to move the charging cars on their track so that the boxes will register with the furnace doors, the charging arm 47 is lowered within the notch or opening 62 in the truck frame, when it is held firmly thereby and the charging machine is traversed on its tracks by operating the motors 68 in either direction as required. While this is being done no bending or torsional stresses are transmitted to the mechanism as is usual with other constructions.

The charging machine may be traversed on its tracks in either direction to register with any furnace door or any furnace desired.

My machine is thus seen to be compact and complete with all parts operated mechanically and so arranged as not to be subjected to unnecessary stresses from any cause.

Although I have shown and described my invention in considerable detail, I do not wish to be limited to the exact and specific details thereof, as shown and described, but may use such modifications in, substitutions for, or equivalents thereof as are embraced within the scope of my invention, or as pointed out in the claims.

Having thus described my invention, what I claim and desire to secure by Letters Patent is:—

1. In a furnace charging machine, a charging bar, the rear end of which is supported by a pair of hinged members, and means for swinging the same backward or forward, whereby the bar is tilted upwardly or downwardly.

2. In a furnace charging machine, a charging bar, the rear end of which is mounted on a pair of hinged members spaced apart and so arranged that they may be swung backward or forward to tilt the bar upwardly or downwardly, while its rear portion is approximately stationary.

3. In a furnace charging machine, a charging bar, the rear portion of which is mounted on a pair of hinged members spaced apart and arranged at such angles, that when the bar is substantially horizontal, a rear swinging movement of said hinged members will cause the bar to be tilted upwardly and a forward swinging movement thereof will tilt the bar downwardly, and means for swinging said hinged members.

4. In a furnace charging machine, a charging bar, the rear portion of which is mounted on a pair of hinged members spaced apart and arranged at such angles, that when the bar is substantially horizontal, a rear swinging motion of said hinged members will cause the bar to be tilted upwardly and a forward swinging movement thereof will cause the bar to be tilted downwardly, and means for swinging said members and for traversing them and the attached bar, in directions substantially coincident with the longitudinal axis of the bar.

5. A charging machine, comprising a pair of standards carried on wheeled trucks mounted on a single rail on the charging floor, a pair of girders secured to and extending forwardly and rearwardly from the same, the forward ends of said girders being mounted on a track above a furnace, a pair of rails on said girders, a carriage on said latter rails, means for traversing said carriage backward and forward, a pair of hinged members spaced apart and pivotally mounted on said carriage with their lower ends pivoted to a charging bar, and means for swinging said hinged members whereby the charging bar is tilted as desired.

6. A charging machine, comprising a pair of standards mounted on wheel trucks carried on a rail on the charging floor, a pair of girders mounted thereon and extending substantially in a horizontal direction, the forward ends of said girders being carried by trucks adapted to travel on upper stationary supports, a pair of rails mounted on said pair of girders, a wheeled carriage mounted on said pair of rails, a pair of hinge member spaced apart and pivoted to said carriage at their upper ends, a charging bar section pivoted to the lower ends of said hinge members, a charging bar secured to the lower parts of said section, having an outer shell, and an inner rotatable member, which latter is provided with an end flange and a locking rod adapted to grasp and release charging boxes, and power means for traversing said carriage, for swinging said hinge members, for rotating said inner member, and for projecting and retracting said locking rod.

7. In a charging machine, a structural frame, a wheeled carriage mounted on the upper portion thereof and provided with power means for moving it backward and forward thereon, a pair of hinge members pivoted to said carriage spaced apart and extending downwardly therefrom, a charging bar the rear section of which is pivotally mounted on the lower ends of said hinge members, power means for swinging said hinge members, whereby the bar is tilted upwardly or downwardly as desired, the pivots of said hinge members being long to provide inherent stability, and a charging bar removably secured to said section.

8. In a charging machine, a structural frame, a wheeled carriage mounted on the upper portion thereof and provided with means for moving it backward and forward thereon, a pair of hinge members pivoted to said carriage spaced apart and extending downwardly therefrom, a charging bar the rear section of which is pivotally mounted on the lower ends of said hinge members, power means for swinging said hinge members, whereby the bar is tilted upwardly or downwardly as desired, the pivots of said hinge members being of considerable length to provide inherent stability, and a structural member provided with cheek pieces forming a notch adapted to receive the charging bar near its outer portion, thereby providing a firm lateral support therefor.

9. In a charging machine, a charging bar comprising an outer approximately cylindrical hollow shell having an integral upwardly extending portion at the rear end thereof adapted to be secured to an upper section, a motor mounted within said portions, a longitudinally perforated interior member, rotatably mounted in said shell, secured longitudinally thereof and provided with a flanged end adapted to cooperate with a charging box, a locking bar mounted within said longitudinal perforation and provided with means connected with the motor aforesaid for projecting and retracting the same.

10. In a charging machine, a charging bar comprising an outer approximately cylindrical hollow shell having an integral upwardly extending portion at the rear end thereof adapted to be secured to an upper section, and within which portion a motor is mounted, an interior longitudinally perforated member rotatably mounted in said shell and secured longitudinally thereof, and provided with a flanged end adapted to co-operate with a charging box, a locking bar mounted within the longitudinal perforation, power operated means adapted to rotate said interior member, and means connected with the motor aforesaid adapted to project, and retract the locking bar.

In witness whereof I hereunto affix my signature.

HARRY R. GEER.